United States Patent [19]

Bohn

[11] Patent Number: 4,503,711

[45] Date of Patent: Mar. 12, 1985

[54] TRAVELLING WAVE FLOWMETER

[75] Inventor: David C. Bohn, Stillwater Township, Washington County, Minn.

[73] Assignee: Rosemount Inc., Eden Prairie, Minn.

[21] Appl. No.: 537,973

[22] Filed: Sep. 30, 1983

[51] Int. Cl.³ .............................................. G01F 1/58
[52] U.S. Cl. ............................ 73/861.12; 73/861.15
[58] Field of Search ........... 73/861.11, 861.12, 861.16, 73/861.15

[56] References Cited

U.S. PATENT DOCUMENTS

| | | |
|---|---|---|
| 2,750,461 | 6/1956 | Bunch . |
| 3,714,826 | 2/1973 | Tsunoda et al. . |
| 3,967,500 | 7/1976 | Forster . |
| 4,236,411 | 12/1980 | Ketelsen . |
| 4,346,605 | 8/1982 | Skladzien et al. . |

FOREIGN PATENT DOCUMENTS

| | | | |
|---|---|---|---|
| 831226 | 3/1960 | United Kingdom . | |
| 1023026 | 3/1966 | United Kingdom | 73/861.11 |
| 0166516 | 12/1964 | U.S.S.R. | 73/861.11 |
| 0169816 | 6/1965 | U.S.S.R. | 73/861.11 |
| 0142783 | 8/1966 | U.S.S.R. | 73/861.11 |

OTHER PUBLICATIONS

Book entitled, "The Theory of Electromagnetic Flow-Measurement", by J. A. Shercliff, Cambridge at the University Press, 1962, pp. 102, 103.

Primary Examiner—Charles A. Ruehl
Attorney, Agent, or Firm—Kinney & Lange

[57] ABSTRACT

A travelling wave magnetic flowmeter senses the velocity of flow of an electrically conductive fluid through a conduit and provides an output signal representative of the velocity of flow. A first pair of coils providing a first magnetic field and a second pair of coils providing a second magnetic field are disposed on the conduit. The first and second magnetic fields are varied in strength and at least partially combined to form a travelling composite magnetic field, a portion of which interacts with the fluid to induce an electromotive force. A pair of electrodes are electrically isolated from the conduit and disposed in the conduit between the first and second coils. The electrodes are electrically coupled to the fluid to provide a detected signal representative of the electromotive force. A control circuit coupled to the first and second coils and coupled to the electrodes to receive the detected signal, controls an electrical current shifted between the first coils and the second coils such that the travelling composite magnetic field travels in the direction of fluid flow at a speed representative of the fluid velocity.

24 Claims, 8 Drawing Figures

TRAVELLING WAVE FLOWMETER

BACKGROUND OF THE INVENTION

Field of the Invention

The present invention relates to magnetic flowmeters and in particular to an electromagnetic flowmeter having a magnetic field which moves with a speed representative of fluid velocity.

SUMMARY OF THE INVENTION

The present invention relates to a travelling wave flowmeter for sensing the velocity of flow of an electrically conductive fluid through a conduit. A first means is disposed on the conduit for providing a first magnetic field, at least a portion of which passes through the fluid. A second means is disposed on the conduit a desired distance along the conduit from the first means for providing a second magnetic field, at least a portion of which passes through the fluid. The first and second magnetic fields are varied in strength and at least partially combine to form a composite moving magnetic field, moving at a controlled speed. The composite moving magnetic field interacts with the fluid to induce an electromotive force. Detecting means are electrically isolated from and disposed in the conduit between the first and second means and are electrically coupled to the fluid for providing a detected signal representative of the induced electromotive force. A control means is coupled to the detecting means and to the first and second means to control the moving magnetic field as a function of the fluid velocity.

In one preferred embodiment, the first and second means comprise pairs of coils of insulated, electrically conductive wire diametrically disposed on opposite exterior surfaces of the conduit. A coil driver shifts electrical current between the coils to provide the effect of the travelling composite magnetic field which moves with a speed determined by the rate at which the electrical current is shifted. When the speed of the composite magnetic field is substantially equal to the fluid velocity, the electromotive force is minimized at the detecting means. The amplitude of the electrical current supplied to the coils need not be regulated precisely, as the speed, rather than long term constant strength of the magnetic field is preferably used to determine fluid velocity.

The detecting means comprises at least two electrodes electrically isolated from the conduit, disposed on opposite interior surfaces of the conduit and electrically coupled to the fluid such that a line drawn between the electrodes is substantially transverse to both the direction of fluid flow and the magnetic field. When the electrically conductive fluid comes in contact with an electrically conductive conduit, portions of the electromotive force tend to short to the conduit, reducing the detected signal. Shorting effects significantly affect the performance of conventional stationary magnetic field flowmeters because the precise amplitude of the detected signal is measured, resulting in the necessity for extensive non-conductive liners about the electrodes to prevent reduction of the amplitude by shorting effects. In the present invention, measurement of the precise amplitude of the induced electromotive force is not required. The electrodes need only be insulated such that shorting effects proximate the electrodes are reduced sufficiently to detect the polarity of the induced electromotive force.

Further benefits of the present invention result from deriving flow information from the polarity of the detected signal rather than from precise measurement of the induced electromotive force. Temperature changes of coil driving circuitry usually occur slowly when compared to the period during which current is shifting even when such circuitry is located proximate to the conduit. Temperature dependent changes in coil current supplied by such circuitry also occur comparatively slowly and have little effect on the rate of shift of the coil current during a shift period and therefore have a relatively insignificant effect on determining the induced electromotive force polarity. Also, since the precise amplitude of the detected electromotive force is not used in the preferred embodiment to determine the velocity of flow of the fluid in the conduit, amplification of the amplitude need not be linear. Hence significant temperature compensation and linearization circuitry is not required and, thus, simple circuitry can be used to determine the polarity of the detected signal and control the current supplied to the coils.

DETAILED DESCRIPTION OF THE PREFERRED EMBODIMENTS

Figure 1:
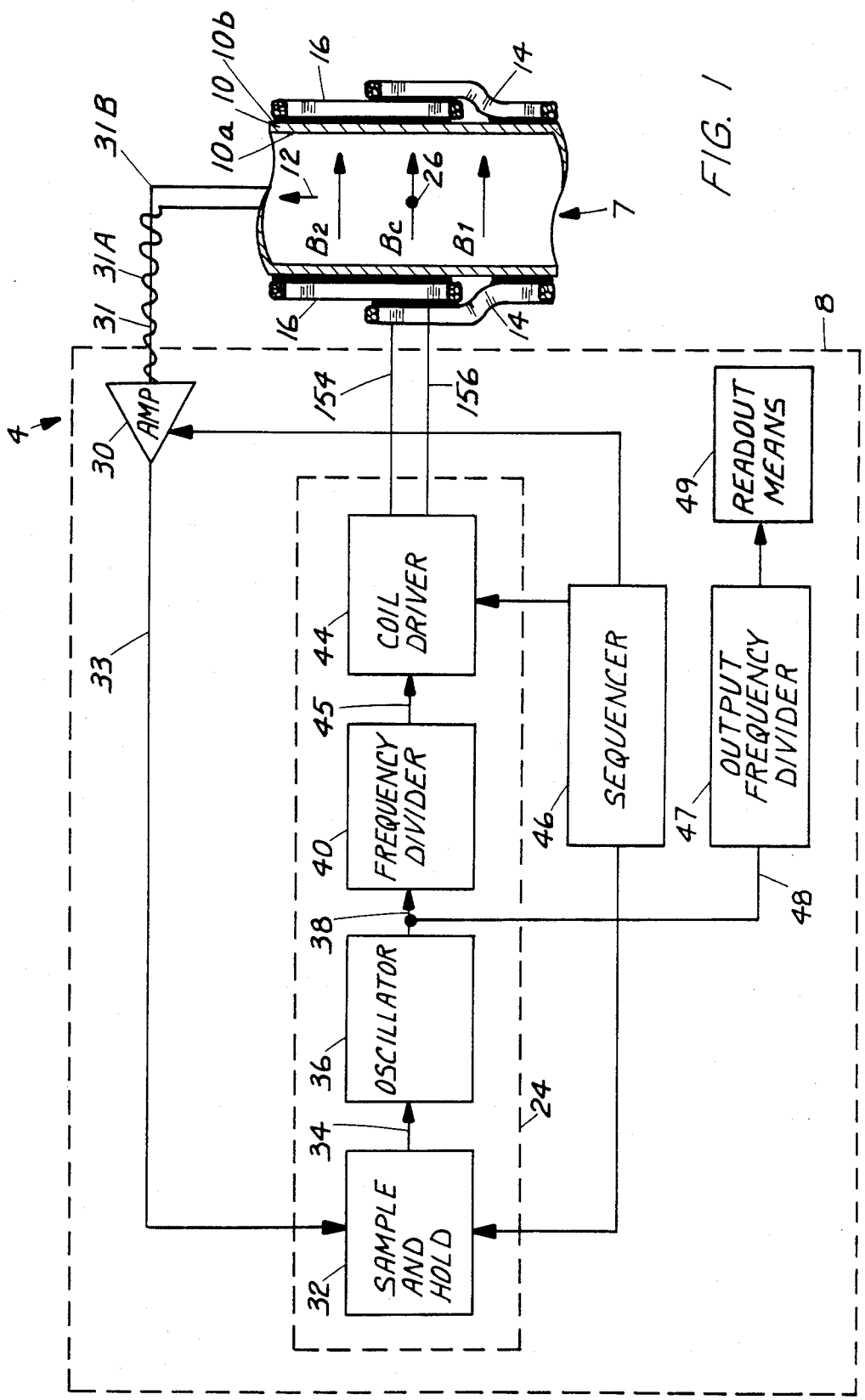
FIG. 1 is a block diagram representation of a circuit, and a transverse sectional representation of a flowtube of a preferred embodiment of a magnetic flowmeter made according to the present invention.

In FIG. 1, a preferred embodiment of the present invention comprises a magnetic flowmeter indicated generally at 4. Magnetic flowmeter 4 comprises a flowtube indicated generally at 7 and circuitry enclosed by a broken line 8. Flowtube 7 comprises a conduit 10 which has an interior surface 10a and an exterior surface 10b. Conduit 10 is preferably constructed of a nonmagnetic material such as stainless steel for passing an electrically conductive fluid therethrough. In one example, the fluid preferably travels through conduit 10 in a direction indicated generally by an arrow 12, however it is noted that flowmeter 4 operates equally well in response to fluid travel in the direction generally opposite of arrow 12. It is desirable that the fluid be a liquid or slurry substantially without bubbles. A first means (also referred to as first coils 14) for providing a first magnetic field represented by a magnetic field vector B1 is disposed on conduit 10. First coils 14 preferably comprises a pair of coils of electrically conductive insulated wire oppositely supported as by adhesive material or other suitable means on exterior surface 10b of conduit 10 such that when an electrical current is applied to first coils 14, at least a portion of the first magnetic field passes through the fluid and has a component having a magnitude and direction substantially normal to the overall direction of fluid flow which is preferably along the longitudinal axis of conduit 10. A second means (also referred to as second coils 16) for providing a second magnetic field represented by a magnetic field vector B2 preferably comprise a pair of coils of electrically conductive insulated wire oppositely supported on exterior surface 10b of conduit 10 a desired position downstream in relation to first coils 14 as indicated by arrow 12. Second coils 16 preferably partially overlap first coils 14 over a portion of conduit 10. At least a portion of the second magnetic field passes through the fluid and has a component having a magnitude and direction basically normal to the general direction of fluid flow.

Figure 2:
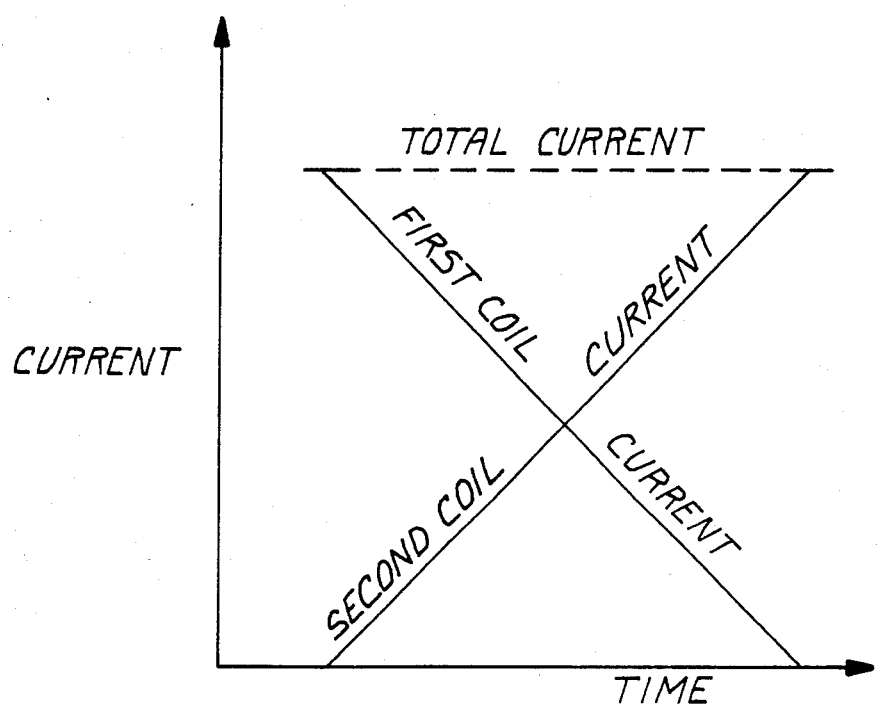
FIG. 2 is a graphic representation of a preferred current shifting function, shown as current versus time, for energization of the flowmeter of the preferred embodiment of FIG. 1.

A control means shown within a broken line 24 provides electrical current to first coils 14 and second coils 16 to produce the first and second magnetic fields. The total current provided by control means 24 is preferably constant, and is shifted by control means 24 between first coils 14 and second coils 16. A preferred current shifting function of control means 24 for shifting the current substantially linearly with respect to time is represented in FIG. 2. In one preferred embodiment, as when flow is in the direction as indicated by arrow 12, the total current is first applied to first coils 14 and shifted during a period of time at a substantially constant rate to second coils 16 such that at the end of the period, the total current is applied to second coils 16. The result of shifting the current in accord with the function shown in FIG. 2 is a corresponding shift in the strength of the first magnetic field and shift in the strength of second magnetic field. In FIG. 1, the first and second magnetic fields in effect at least partially combine to form a composite moving magnetic field represented by a magnetic field vector Bc which, because of the shifting strengths of the first and second magnetic fields, moves with a controlled speed and strength in the direction of current shift, preferably in the direction of arrow 12 which is the direction of fluid flow in this example. Magnetic field vector Bc has a component transverse to the general direction of fluid flow. During the time interval when currents are shifting, the composite magnetic field has a substantially constant strength in the volume of fluid near the electrodes while the composite magnetic field is moving in the direction of arrow 12.

The composite magnetic field has a main component basically normal to the principal direction of fluid flow. A detecting means comprises at least two electrodes 26 electrically isolated from and disposed in conduit 10 (only one electrode is shown) and corresponding conductors 31 and 31A which are coupled to electrodes 26. The conductors 31 and 31A extend from electrodes 26 longitudinally along flowtube 10 in the direction indicated by arrow 12 or in a direction opposite that indicated by arrow 12 to an area generally indicated at 31B. Area 31B is remote from effects of the magnetic fields produced by the coils such that significant undesirable electromotive forces are not produced by interaction of conductors 31 and 31A with the magnetic fields. Electrodes 26 are electrically coupled to the fluid and positioned oppositely on the interior surface 10a of conduit 10 such that a line drawn between electrodes 26 is at least partially and preferably substantially transverse to the magnetic field vectors and to the direction of fluid flow. A signal, preferably a voltage difference, is detected by electrodes 26 and conductors 31 and 31A. When the magnitude of the signal detected is at or near zero, the speed of the composite magnetic field is substantially equal to the velocity of fluid flow. The detected signal is coupled to gated amplifier circuitry 30 which is located beyond area 31B from electrodes 26 by conductors 31 and 31A. Amplifier circuitry 30 is preferably a multistage amplifier coupled to zeroing circuitry such as that described in U.S. Pat. No. 4,262,543 to Grebe which is herein incorporated by reference. Although the zeroing system of U.S. Pat. No. 4,262,543 is described with respect to a pulsed direct current magnetic flowmeter, it is equally applicable to the present invention by coupling the output of second stage amplifier 19' in U.S. Pat. No. 4,262,543 to line 33 in the present Application and coupling conductors 31 and 31A in the present Application to the inputs of differential preamplifier 11 of U.S. Pat. No. 4,262,543. From amplifier circuitry 30 the detected signal is carried by a line 33 to control means 24. Control means 24 adjusts the rate of shift of current between first coils 14 and second coils 16 based on the difference between fluid flow velocity and composite magnetic field speed as represented by the amplitude and sign of the detected signal, to substantially match the speed of the composite magnetic field to the velocity of fluid flow in conduit 10. The magnetic flowmeter 4 is powered and preferably shielded from magnetic fields not generated by flowmeter 4 in a conventional manner.

In one preferred embodiment, control means 24 further comprises a sample and hold circuit 32 coupled to amplifier circuitry 30 by line 33. Sample and hold circuit 32 samples the output of amplifier circuitry 30 on line 33 and provides a sampled signal along a line 34 to an oscillator 36. The sampled signal is representative of the detected signal. Oscillator 36 provides a frequency signal along a line 38 having a frequency determined by the sampled signal. The frequency signal is divided by a first frequency divider 40 to provide a second frequency along a line 45. The second frequency on line 45 is coupled to a coil driver 44. Coil driver 44 provides the electrical current to first coils 14 and second coils 16 and shifts such current between first coils 14 and second coils 16 at a rate proportional to the second frequency. The oscillator frequency and second frequency are preferably greater than the current shift frequency but are each substantially proportional to the velocity of the fluid.

Figure 3:
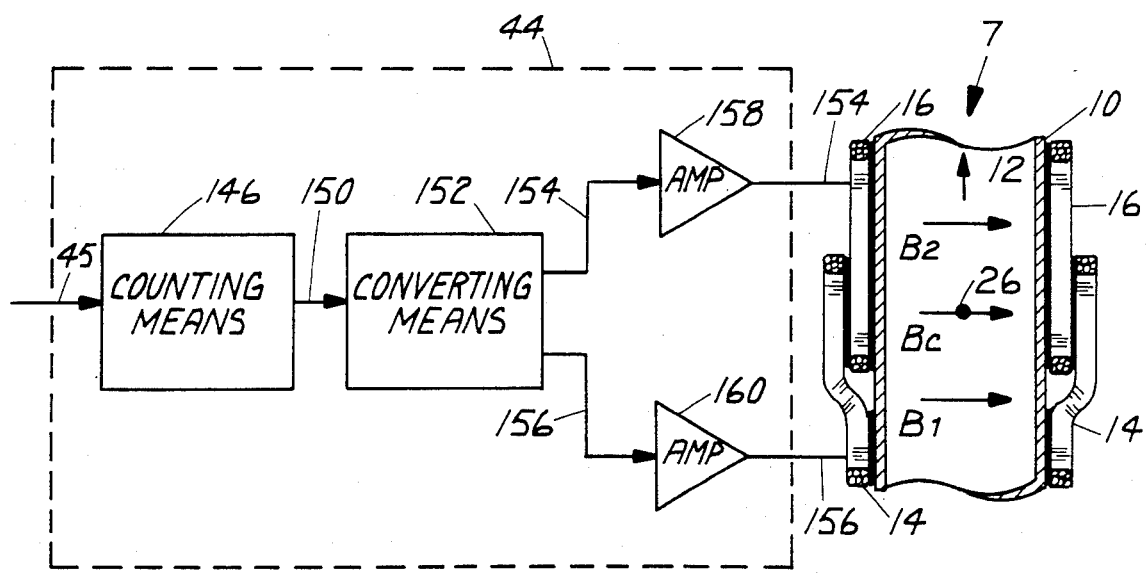
FIG. 3 is a block diagram representation of a preferred current shifting controller for shifting current in accordance with the function in FIG. 2.

In FIG. 3, wherein the numbering is consistent with FIG. 1, a preferred embodiment of coil driver 44 comprises a counting means 146 for counting the cycles of the second frequency supplied on line 45. Counting means 146 provides a digital signal, preferably a digital word, the value of which increases as a function of time at a rate controlled by the second frequency to a bus 150. Bus 150 is coupled to a converting means 152 for converting the digital signal on bus 150 to a first analog signal and a second analog signal on lines 154 and 156 respectively which are amplified by a first amplifier means 158 and a second amplifer means 160 respectively. The first analog signal is controlled to increase as the digital signal on bus 150 increases, while the second analog signal is controlled to decrease as the digital signal increases. First amplifier means 158 energizes first coils 14 with a current proportional to the first analog signal on line 154 and second amplifier means 160 energizes second coils 16 with a current proportional to the second analog signal on line 156 to provide a moving magnetic field in conduit 10.

In one embodiment, counting means 146 is a 12 bit binary counter model CD 4040 BCN manufactured by National Semiconductor Corp., converting means 152 is an eight bit digital-to-analog converter model DAC-08 manufactured by Precision Monolithics and second amplifier means 158 and 160 each contain a quad operational amplifier model LM224J manufactured by National Semiconductor Corp. The four amplifiers in the LM224J are arranged as a first stage amplifier coupled to the second and third amplifier acting as a two stage integrator feeding a summing junction which sums the output from the two stage integrator with at least a portion of the coil current. The summing junction feeds the fourth operational amplifier which is a coil driver with an output coupled to drive an MJ1001 Darlington pair of transistors for driving the coils.

Figure 4:
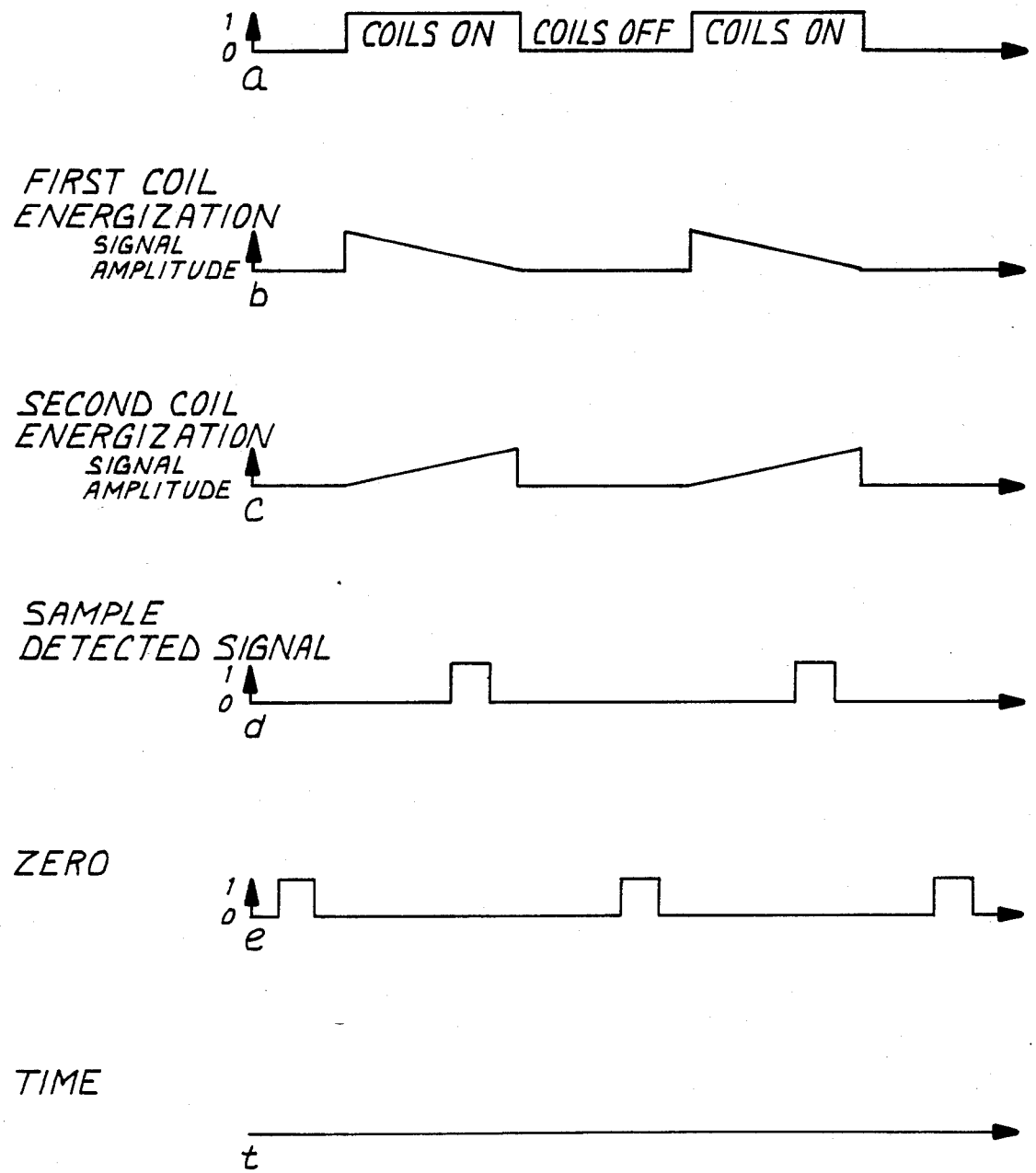
FIG. 4 is a timing diagram of certain signals versus time for timing operation of the preferred embodiment of the flowmeter of FIG. 1.

Referring to FIGS. 1 and 4, a sequencer 46 sequences the operation of gated amplifier circuitry 30, sample and hold circuit 32 and coil driver 44 in accord with a timing diagram having output signals a, b, c, d, and e as a function of time, t, in FIG. 4. The time scale t along the horizontal axis of the diagrams of FIG. 4 varies with the speed at which the composite moving magnetic field travels. As represented in trace a, first coils 14 and second coils 16 are supplied current and alternately not supplied current such that amplifier circuitry 30 zeroing represented in trace e and substantially as described in U.S. Pat. No. 4,262,543, occurs while current is not supplied which reduces effects of undesired electrochemical electromotive forces about the electrodes. Galvanic reactions proximate to electrodes in flowmeter conduits cause undesired electrochemical electromotive forces about the electrodes. Traces b and c represent respective current energizations of first coils 14 and second coils 16 to provide the composite moving magnetic field. Trace d represents the timing of sample and hold circuit 32. Sampling of the amplified detected signal on line 33 occurs while both first coils 14 and second coils 16 are energized and their respective currents are shifting at a substantially constant rate, preferably just after the currents are equal. When the currents are shifted at a substantially constant rate, the moving magnetic field moves at a substantially constant speed which is preferably equal to the overall fluid velocity. The detected signal is sampled just after the currents are equal to ensure the moving magnetic field is proximate the electrodes and that the electromotive force to be detected has attained a steady state condition. Because zeroing of amplifier circuitry 30 represented in trace e occurs while no current is provided to first coils 14 and second coils 16, electrochemical electromotive force affects are minimized. In a further preferred embodiment, first coils 14 and second coils 16 are energized by sinusoidal AC signals in a selected 90° degree phase relationship, and the frequency of the AC signals is controlled to match the composite magnetic field speed to the fluid velocity. Using AC signals to energize first coils 14 and second coils 16 also reduces the effects of undesired electrochemical electromotive forces and eliminates the need for zeroing. Other forms of energization are within the scope of the present invention.

In operation of the preferred embodiment of FIG. 1, fluid travelling generally in the direction indicated by arrow 12 and having velocities greater than the composite magnetic field speed result in a positive detected signal on lines 31 and 31A which is amplified by amplifier circuitry 30 and sampled by sample and hold circuit 32. The sampled signal on line 34 causes oscillator 36 to increase its oscillation frequency signal on line 38. The oscillation frequency signal is divided by first frequency divider 40 to provide the second frequency to coil driver 44, which increases the current shift rate and increases the composite magnetic field speed. Likewise, a composite magnetic field speed greater than the fluid velocity results in a detected signal of opposite polarity which causes a decrease in the sampled signal. The decrease in sampled signal further decreases the frequency of the frequency signal and hence reduces the frequency of the second signal which in turn reduces the speed of the composite magnetic field. The shift rate is iteratively changed such that the detected signal is minimized, corresponding to a substantially equal composite magnetic field speed and fluid velocity, and the frequency of the frequency signal is representative of the fluid velocity. Sequencer 46 operates as previously described. In one embodiment, an output means comprising a second frequency divider 47 is coupled to the frequency signal on line 38 by a line 48 to provide a 0 to 10 kilohertz output signal or other signal representative of fluid velocity and flow when calibrated for conduit geometry to a readout means 49, computing means or other suitable device.

Figure 5:
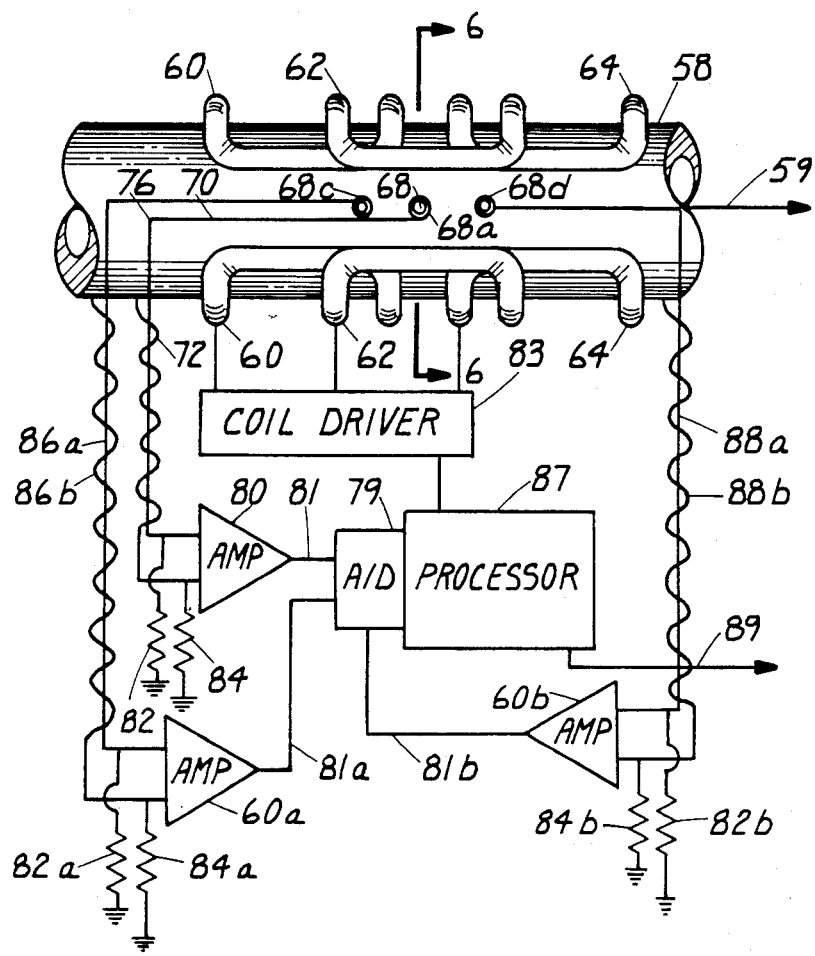
FIG. 5 is a block diagram representation of a circuit and a transverse elevational view of a further preferred embodiment of a flowmeter made according to the present invention.
Figure 6:
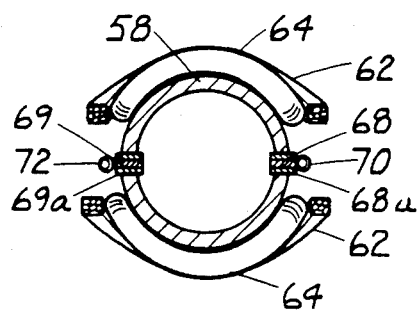
FIG. 6 is a cross sectional view of the preferred embodiment of FIG. 5 taken along line 6—6.

In FIG. 5 and FIG. 6 which are numbered consistently with each other, a further preferred embodiment of the present invention comprises a conduit 58 which can be an open fluid conductor for conducting a fluid therethrough preferably in the direction indicated by arrow 59. Conduit 58 has a first pair of coils 60, a second pair of coils 62 and a third pair of coils 64, each pair of coils being diametrically disposed on opposite exterior surfaces of conduit 58 to provide a composite magnetic field at least a portion of which is within conduit 58 having its main component oriented substantially transverse to the general direction of fluid flow. First coils 60 are preferably placed upstream and adjacent third coils 64 on conduit 58. Second coils 62 are preferably placed to overlap both first coils 60 and third coils 64 on conduit 58. First coils 60, second coils 62 and third coils 64 are provided electrical current such that the composite magnetic field travels in the direction of fluid flow, and an electromotive force is generated in the electrically conductive fluid when the composite magnetic field speed and the fluid velocity are different. At least two electrodes 68, 69 are preferably electrically isolated from conduit 58 as by insulators 68a and 69a respectively, and selectively positioned on opposite interior surfaces of conduit 58 between first coils 60 and third coils 64 in electrical contact with the fluid to detect the electromotive force. Overlapping coils in a desired manner enables the composite magnetic field to travel at a constant speed and intensity as it travels past the electrodes 68, 69.

Figure 7:
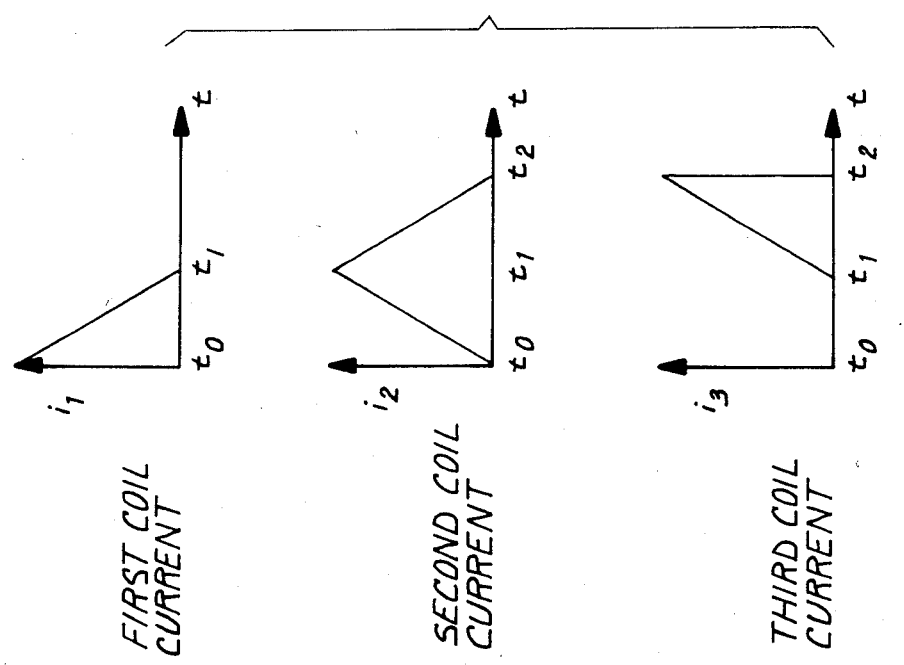
FIG. 7 is a graphic representation of a preferred current shifting function, shown as current versus time, for energization of the further preferred embodiment of FIG. 5.

The current supplied to first coils 60, second coils 62 and third coils 64 is preferably supplied in accord with FIG. 7. At the beginning of a current supply period, current is supplied to first coils 60 such that a magnetic field exists almost entirely upstream of electrodes 68, 69. Current is then shifted to second coils 62 causing the composite magnetic field to travel downstream at a speed dependent on the rate of shift of the current. At the point where all current is supplied to second coils 62, the composite magnetic field is centered about the electrodes 68, 69 and proceeds to move downstream as current is shifted to third coils 64. Current is shifted in a manner such that the composite magnetic field magnitude and speed are substantially constant while the composite magnetic field travels past electrodes 68, 69 and the induced electromotive force is detected. This ensures that the electromotive force induced in the fluid is almost entirely a function of the difference between the speed of the composite magnetic field and the velocity of fluid flow. If the magnitude of the composite magnetic field is changing or the composite magnetic field speed is changing during a current supply period, undesirable electromotive forces may be generated.

Temperature changes in the current supply circuitry occur slowly with respect to current supply periods. While the current supplied should be constant during a period, it is not necessary that the current be the same for different periods, substantially eliminating long term amplitude stability requirements and the need for temperature corrections in the circuitry which supplies the current to the coils. The magnitude and speed of the composite magnetic field is changed as desired during a period in further preferred embodiments to compensate for imprecise coil placements and conduit geometry.

A communicative means, preferably electrically conductive wire 70, 72 is coupled to electrodes 68, 69 respectively for carrying the detected electromotive force. Wires 70, 72 extend from electrodes 68, 69 along a course defined by the travel of the composite magnetic field, preferably along the exterior surface of conduit 58 to a location 76 substantially remote from significant effects of the composite magnetic field. The placement of wires 70, 72 substantially eliminates the induction of an undesired electromotive force in wires 70, 72 by the composite magnetic field. Wires 70, 72 couple electrodes 68, 69 to an amplifier 80. Amplifier 80 supplies a signal on line 81 to an appropriate analog to digital converter 79 which in turn is coupled to a processor means 87. Processor means 87 is coupled to a coil driver 83 for providing the electrical current supplied to first coils 60, second coils 62 and third coils 64 and the output signal on a line 89.

Wires 70 and 72 are preferably coupled to circuit common through two resistors 82 and 84 respectively. Resistors 82 and 84 effectively load electrodes 68, 69 and are useful in an empty conduit situation where, when no fluid is present, the detected signal is at or near zero. In prior conventional magnetic flowmeters, loading of the electrodes detrimentally reduces the amplitude of the detected signal. In empty conduit situations with no loading of the electrodes, an open circuit develops leading to widely fluctuating detected signals not representative of flow. The load of resistors 82 and 84 on electrodes 68, 69 in the present invention has a minimal effect on the minimization of the detected signal because the polarity of the detected signal is more significant than the amplitude of the detected signal in determining fluid velocity. In an empty conduit situation, fluctuating detected signals are minimized through the load of resistors 82 and 84. The load also advantageously permits control of amplifier 80 offsets.

Processor means 87 controls coil driver 83 which provides the current supplied to first coils 60, second coils 62, and third coils 64. The control is preferably a function of the polarity and amplitude of the electromotive force detected by electrodes 68, 69, such as proportional-integral-derivative control such that the rate of current shift quickly converges to a rate representative of the fluid velocity. It is also within the scope of the present invention for other forms of control to be implemented such as polynomial expansions or look up tables.

In conventional non-moving field magnetic flowmeters, the amplitude of the detected signal from the electrodes is directly proportionally representative of the fluid velocity and precise processing of the detected signal is required. In the preferred embodiment of FIGS. 5 and 6, the amplitude of the detected signal contains no desired direct fluid velocity information. In fact, the detected electromotive force is minimized rather than directly processed to obtain the fluid velocity. The detected signal is minimized as a function of the polarity of the detected signal. Therefore, the amplitude linearity and temperature stability of amplifier 80 is not significant to the performance of the flowmeter. Because measurement of the precise amplitude of the induced electromotive force is not critical, electrodes 68, 69 need only be insulated from conduit 58 such that the polarity of the detected signal is ascertainable. Since the extensive insulation on conventional magnetic flowmeters usually wears out quickly, especially in slurry applications, a reduction in insulation requirements greatly extends the life of a magnetic flowmeter.

In a further mode of operation of the preferred embodiment of FIGS. 5 and 6, a pair of second electrodes 68c (one shown) are positioned on opposite interior surfaces of a portion of conduit 58 where first coils 60 and second coils 62 overlap to detect an electromotive force. Second electrodes 68c are coupled by lines 86a and 86b to an amplifier 60a. Amplifier 60a provides a second amplified detected signal on a line 81a to processor means 87. A pair of third electrodes 68d (one shown) are similarly positioned where second coils 62 and third coils 64 overlap. Third electrodes 68d are coupled by a pair of lines 88a and 88b to an amplifier 60b. Second electrodes 68c and third electrodes 68d are similarly coupled to circuit common through resistors 82a, 84a and 82b, 84b respectively. Amplifier 60b provides a third amplified detected signal on a line 81b to processor means 87 through analog to digital converter 79. First coils 62 are energized with current, and the current is shifted at an increasing rate to second coils 62 and third coils 64 such that the speed of the composite magnetic field is controlled to vary from less than the velocity of fluid flow at second electrodes 68c to greater than the velocity of fluid flow at third electrodes 68d. Second electrodes 68c, first electrodes 68, 69 and third electrodes 68d each detect signals representative of the induced electromotive forces present at each electrode. Such signals are then processed by processor means 87 and compared to the corresponding magnetic field speeds at each electrode to provide an improved output signal on line 89 based on an interpretation of a curve defined by the signals and to further control the current supplied to the coils.

Figure 8:
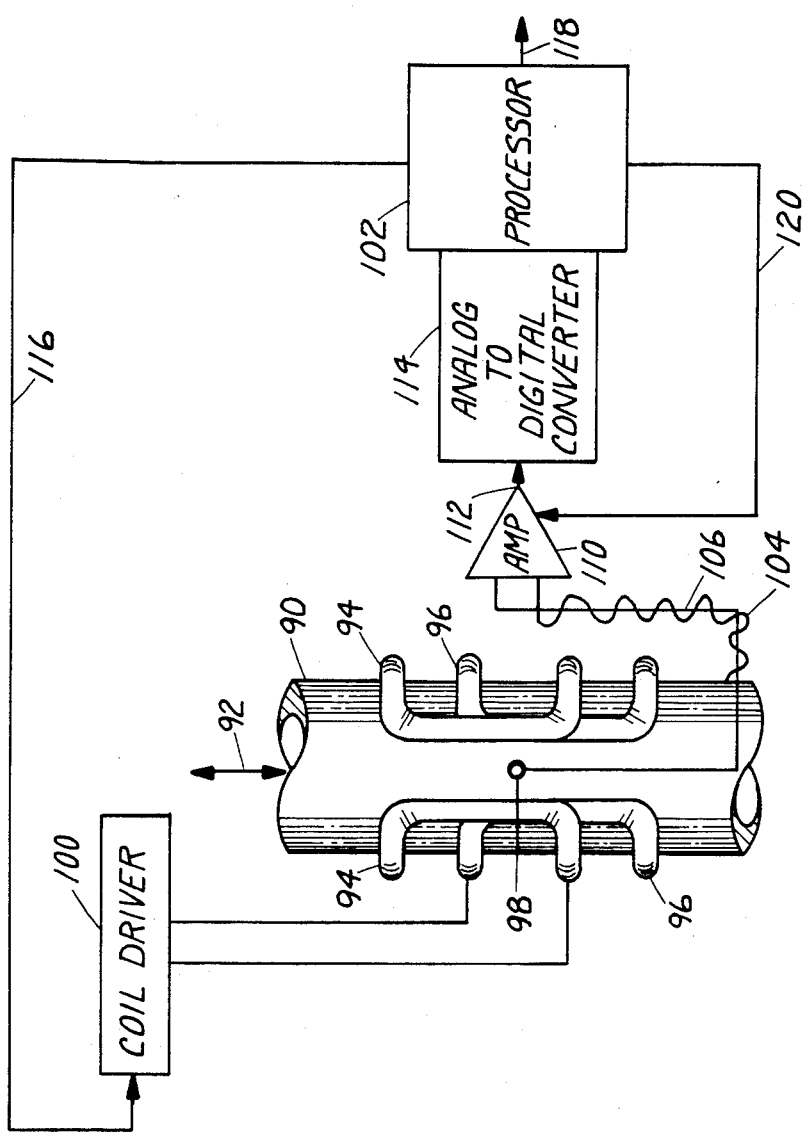
FIG. 8 is a block diagram representation of a circuit and a transverse elevation view of yet a further preferred embodiment of a flowmeter made according to the present invention.

In FIG. 8, a further preferred embodiment of the present invention comprises a conduit 90 for passing an electrically conductive fluid in either direction along the length of conduit 90 as indicated by arrow 92. A first pair of coils 94 is conformingly affixed to opposite exterior surfaces of conduit 90 for generating a portion of a composite moving magnetic field having a component within the fluid substantially normal to the general direction of fluid flow, the composite magnetic field travelling generally in the direction of fluid flow 92. A second pair of coils 96 is also preferably similarly affixed to conduit 90 at least partially shifted over from first coils 94 along the length of conduit 90 and partially overlaps first coils 94 for generating a portion of the composite magnetic field. A pair of electrodes 98 (one shown) are insulated from conduit 90 and disposed on opposite interior surfaces of conduit 90, preferably within an area defined by the overlapping portions of the coils and positioned to detect an induced electromotive force in the fluid. A coil driver 100 shiftingly provides current to first coils 94 and second coils 96. Coil driver 100 is controlled by a processor means 102 such as a microprocessor. The detected electromotive force is carried from electrodes 98 on a pair of conductors 104 and 106 which extend along the length of the exterior of conduit 90 from electrodes 98 in either of the directions indicated by arrow 92 until conductors 104 and 106 are substantially external to the composite magnetic field and then coupled to an amplifier 110 for amplification of the detected signal. Amplifier 110 provides an amplified signal on a line 112 which is coupled to an analog-to-digital converter 114 which in turn is coupled to processor 102. Converter 114 converts the amplified detected signal on line 112 to a digital form compatible with processor 102. Processor 102 supplies a control signal on a line 116 to control coil driver 100 to shift the current at a rate such that the speed of the composite magnetic field is substantially equal to the velocity of fluid flow. Processor 102 provides an output signal on a line 118 representative of the fluid velocity. Processor 102 provides a sample signal on line 120 to amplifier 110 such that amplifier 110 provides the amplified signal at selected times when it is representative of the composite magnetic field speed and fluid velocity difference and when processor 102 is ready to accept such output. This preferably occurs when the composite magnetic field is travelling past electrodes 98 at a constant speed and magnitude.

Processor 102, in a further preferred embodiment, selectively controls coil driver 100 to provide current either to first coils 94 or second coils 96 at the beginning of a current supply period. Current is then shifted to second coils 96 or first coils 94 respectively. This results in the composite magnetic field travelling selectively in either direction indicated by arrow 92. This is desirable in low flow situations when alternating the direction of travel of the composite magnetic field and minimizing the detected electromotive forces provides comparative information to processor 102 for more accurately determining fluid velocity in low flow situations. It is also desirable in reverse flow situations where in fact operation is equivalent to previously described flow velocity measurements except that coil current is supplied to second coils 96 at the beginning of a period and shifted to first coils 94. Thus, this preferred embodiment senses the velocity of flow of the fluid in either of the directions indicated by arrow 92 and provides an output signal representative of such fluid flow.

What is claimed is:

1. A magnetic flowmeter which senses a velocity of flow of an electrically conductive fluid through a conduit and provides an output signal representative of the fluid velocity, comprising:
    first means disposed on the conduit for providing a first magnetic field, a portion of which passes through the fluid;
    second means disposed on the conduit in a desired position in relation to the first means for providing a second magnetic field, a portion of which passes through the fluid, the first and the second magnetic fields at least partially combining to form a composite moving magnetic field which interacts with the fluid to induce an electromotive force;
    detecting means disposed on the conduit electrically isolated therefrom and electrically coupled to the fluid for providing a detected signal representative of the induced electromotive force; and
    control means coupled to the detecting means for receiving the detected signal and coupled to the first and to the second means to control the composite moving magnetic field as a function of the fluid flow and provide the output signal.

2. The magnetic flowmeter of claim 1 wherein the control means controls the composite moving magnetic field to move in the direction of the fluid flow with a controlled speed.

3. The magnetic flowmeter of claim 2 wherein the control means controls the speed of the composite moving magnetic field as a function of the detected signal.

4. The magnetic flowmeter of claim 3 wherein the control means controls the speed of the composite moving magnetic field such that the speed is representative of the velocity of the fluid.

5. The magnetic flowmeter of claim 3 wherein the control means minimizes the detected signal such that the speed of the composite moving magnetic field is substantially equal to the velocity of the fluid.

6. The magnetic flowmeter of claim 1 wherein the conduit has an interior surface and wherein the detecting means comprises at least two electrodes oppositely disposed on the interior surface of the conduit.

7. The magnetic flowmeter of claim 6 wherein the composite moving magnetic field has a strength controlled by the control means to be substantially constant as the composite moving magnetic field travels past the electrodes.

8. The magnetic flowmeter of claim 1 wherein the conduit has an exterior surface and wherein the first means comprises a first pair of coils of electrically isolated conductive wire oppositely supported on the exterior surface of the conduit and wherein the second means comprises a second pair of coils of electrically isolated conductive wire oppositely supported on the exterior surface of the conduit.

9. The magnetic flowmeter of claim 8 wherein the first coils and the second coils at least partially overlap each other over a portion of the conduit.

10. The magnetic flowmeter of claim 9 wherein the conduit has an interior surface and wherein the detecting means comprises at least two electrodes oppositely disposed on the interior surface of the conduit and positioned on the portion of the conduit where the first coils and the second coils overlap.

11. The magnetic flowmeter of claim 1 wherein the control means provides an electrical current for a desired period of time, such current being shifted between the first and second means such that the composite moving magnetic field moves with a substantially constant speed and strength as it moves past the electrodes.

12. The magnetic flowmeter of claim 11 wherein the composite moving magnetic field is controlled to move in the direction of fluid flow with a controlled speed substantially equal to the velocity of the fluid.

13. The magnetic flowmeter of claim 11 wherein the control means shifts the electrical current between the first and second means at a rate which determines the composite moving magnetic field speed.

14. The magnetic flowmeter of claim 1 wherein the control means comprises:
   oscillator means coupled to the detecting means for providing a first signal having a frequency determined by the detected signal;
   dividing means coupled to the oscillator means for dividing the frequency of the first signal to provide a control signal; and
   coil drive means coupled to the dividing means for shifting the current between the first and second means as a function of the control signal.

15. The magnetic flowmeter of claim 14 wherein the control means further comprises output means coupled to the oscillator means for providing the output signal.

16. The magnetic flowmeter of claim 1 wherein the conduit has an interior surface, wherein the detecting means comprises at least two electrodes oppositely disposed on the interior surface of the conduit and wherein the control means comprises:
   amplifier means coupled to the electrodes for amplifying the detected signal;
   sample and hold means coupled to the amplifier means for sampling the amplified detected signal; and
   oscillator means coupled to the sample and hold means for providing a first signal as a function of the sampled amplified detected signal.

17. The magnetic flowmeter of claim 16 wherein the detecting means further comprises communicative means coupled to each electrode and to the amplifier means for communicating the detected signal to the amplifier means.

18. The magnetic flowmeter of claim 17 wherein the conduit has an exterior surface and wherein the communicative means comprises an electrically conductive wire extending from each electrode along the exterior surface of the conduit substantially parallel to the direction of the composite moving magnetic field to an area substantially external to effects of the composite moving magnetic field.

19. The magnetic flowmeter of claim 1 wherein the control means comprises:
   coil drive means for shifting an electrical current between the first and second means and to the detecting means at a controlled rate;
   processor means coupled to the coil drive means for controlling the rate of current shift as a function of the detected signal.

20. The magnetic flowmeter of claim 19 wherein the processor means further controls the direction of current shift and hence the composite moving magnetic field direction such that the velocity of fluid can be sensed in either direction of fluid flow.

21. A magnetic flowmeter which senses the velocity of flow of an electrically conductive fluid through a conduit comprising:
   a plurality of coil means consecutively overlappingly supported by the conduit for providing a plurality of magnetic fields, portions of which pass through the fluid, the magnetic fields combining to form a composite moving magnetic field which interacts with the fluid to induce an electromotive force therein;
   detecting means disposed in the conduit, electrically isolated therefrom and electrically coupled to the fluid for providing a detected signal representative of the induced electromotive force; and
   control means coupled to the detecting means and the coil means for controlling the composite moving magnetic field as a function of the detected signal.

22. The magnetic flowmeter of claim 21 wherein the conduit has an interior surface and wherein the detecting means comprises a plurality of pairs of electrodes oppositely disposed on the interior surface of the conduit, each pair of electrodes being positioned in a section of the conduit where consecutive coil means overlap.

23. The magnetic flowmeter of claim 22 wherein the control means shifts an electrical current between consecutive coil means at a changing rate such that the composite moving magnetic field is changed.

24. The magnetic flowmeter of claim 23 wherein the composite moving magnetic field speed is controlled by the control means to change from less than the fluid velocity to greater than the fluid velocity over the length of the conduit having consecutively overlapping coil means such that the detected signals are processed and compared to the varied moving magnetic field speeds to provide an improved output signal representative of fluid velocity.

* * * * *